Patented Sept. 9, 1952

2,610,203

UNITED STATES PATENT OFFICE 2,610,203

PROCESS OF PRODUCING ALDEHYDE ESTERS

Hugh J. Hagemeyer, Jr., and David C. Hull, Kingsport, Tenn., assignors to Eastman Kodak Company, Rochester, N. Y., a corporation of New Jersey No Drawing. Application December 13, 1949, Serial No. 132,799

5 Claims. (Cl. 260—483)

This invention relates to the preparation of aldehyde esters. More particularly, this invention is concerned with an improved method of producing such aldehyde esters from the reaction of unsaturated esters with carbon monoxide and hydrogen. The present invention constitutes a particularly useful method of producing compounds such as gamma formyl ethyl butyrate and the aldehyde esters of succinic acid.

The aldehyde esters of the class described are useful compounds particularly as intermediates. That is, the aldehyde esters may be reduced to form hydroxy compounds which are valuable in the preparation of linear polyesters and lactones. Similarly, the aldehyde esters may be used to form amines. Or the aldehyde esters may be oxidized to form acid esters of utility in the preparation of plasticizers, linear polyesters, polyamides and the like. It is therefore apparent that the providing of an improved method capable of reasonably large-scale operation for producing such acid esters represents a highly desirable result.

We have discovered that the aldehyde esters of the class referred to may be produced by reacting unsaturated esters with carbon monoxide and hydrogen in the presence of a suitable catalyst and under elevated temperature and pressure conditions. The esters of unsaturated acids which may be used are any of the usual unsaturated esters exemplified by alkyl crotonates and the various acrylate esters.

In accordance with the broader aspects of our invention, the unsaturated ester, such as ethyl crotonate, is continuously contacted and reacted with carbon monoxide and hydrogen in the presence of a suitable catalyst at temperatures between 120–200° C. and between 40 and 400 atmospheres. On the other hand, the reaction in the simplest aspect may be batchwise in an autoclave of suitable size.

However, in the preferred operation of our process we utilize a catalyst in a diluent, for example in the ratio of 1/1 to 5–1 parts by volume. As will be described in detail hereinafter, hydroxy diluents such as butanol are preferred, although carbonyl and ether diluents may be used. Likewise, certain hydrocarbon diluents may be used but are considered non-equivalent to the butanol diluent first mentioned. The use of a diluent for the catalyst is preferred for the reason that in this process when a diluent is not used there apparently may be selective absorption of the unsaturated ester on the active surface of the catalyst, thereby causing catalyst deactivation. An alternate preferred operation of our process wherein oxonation of the unsaturated ester is carried out in the absence of a diluent, employs small amounts of water, usually 1 to 20 per cent by weight of the unsaturated ester.

In the commercial operation of our process we would prefer to operate continuously upon a suspension or slurry of the catalyst, to be described in detail hereinafter, in a mixture of the unsaturated ester and hydroxy diluent. This catalyst slurry is pumped continuously to a reaction column maintained at a temperature between 75–200° C. and 40–400 atmospheres. In this continuous operation agitation of the catalyst within the column may be provided by circulating the carbon monoxide and hydrogen through the reaction column by the means of a recycle compressor. The column is operated at total re-flux until the desired product content from the aforementioned reaction is secured. At this point a gradual removal of the contents of the reactor is started, and the aldehyde ester product of the present invention is separated by distillation from the material which is removed from the column. The catalyst and the diluent together with the unreacted components, may be returned to the reaction. Further details concerning preferred continuous operation will be apparent from later description.

As above mentioned, our process involves the use of an ester of an unsaturated acid, carbon monoxide, hydrogen, and a suitable catalyst. Details will now be set forth concerning each of the aforementioned items. We prefer to use a cobalt catalyst in carrying out the present process, although other carbonyl-forming metals, or mixtures thereof with the cobalt catalyst, may be employed. One cobalt-containing catalyst which may be used is a commercially obtainable material known as Harshaw 542. Such catalysts are principally comprised of cobalt but also contain thoria and magnesia. These ingredients are deposited on a carrier, such as kieselguhr, in a 36/2/2/60 ratio. The source of cobalt just mentioned is typical of the type of material that may be used in forming the catalyst employed in the present invention. However, the following catalyst materials are set forth as further illustrations of the type of catalyst that may be used in the present invention. Thirty to 40 per cent cobalt on silica gel and cobalt-thoria and cobalt-magnesia catalysts on filtercel may also be used. Soluble catalysts which have been used in this reaction include: cobalt tetracarbonyl, $Co(CO)_4$, and dimeric cobalt tetracarbonyl, $Co_2(CO)_8$; cobalt tricarbonyl, $[Co(CO)_3]_4$, and cobalt carbonyl butanol, $Co_2(CO)_5.C_4H_7OH$. Of the various catalyst materials, the latter-mentioned type containing a hydroxy component are generally preferred for use in the present invention. That is, as already mentioned, rather than employ the catalyst alone we prefer to employ the catalyst dissolved or suspended in a suitable medium and preferably a lower aliphatic alcohol medium. While butanol is frequently referred to herein as the medium, it is to be understood that isopropanol and the other 2-6 carbon alcohols may likewise be used.

In further regard to the detail of suspending or solvent medium for catalysts, next to the hydroxy type of medium we prefer the carbonyl type of diluent exemplified by methyl ethyl ketone, acetone, and also the various aldehydes. Also, as already mentioned, ethers may be used exemplified by the common ether, di-ethyl ether, and likewise, the other ethers such as propyl ether and lower aliphatic ethers may be used. As the last type of diluent, mention is made of the hydrocarbons, but such type of diluent is not preferred. As a matter of fact, the first-mentioned diluents are sufficiently superior to the other diluents that in general we shall prefer to use a hydroxy or carbonyl diluent, although for the purposes of complete disclosure herein examples are set forth describing our process as carried out when ethers and other compounds are used as diluents.

Commercial sources of carbon monoxide and hydrogen may be used, such as ingredients derived from the water gas reaction. For best operation these gases will be treated, if they contain impurities, to remove components such as sulfur and the like and particularly to remove oxygen and preferably also to remove carbon dioxide.

Any suitable source of esters of unsaturated acids may be employed in this invention. For example, the process functions very satisfactorily with ethyl crotonate and similar esters of unsaturated acids. Further details concerning the various esters which may be reacted in accordance with the present invention will be obtained as the description proceeds. In the preferred embodiment, the reaction is carried out under a temperature between 130 and 160° C. and under pressure between 1600 pounds per square inch and 3500 p. s. i. These and other details will be further apparent from a consideration of the following examples which are set forth to illustrate the present invention.

*Example I*

Twenty grams of a cobalt-thoria-magnesia-catalyst precipitated on kieselguhr and 70 per cent reduced was suspended in 158 grams of ethyl crotonate. The slurry was charged to an 800 ml. stainless steel rocking autoclave and heated to 140° C. Carbon monoxide and hydrogen in a 1/1 ratio were pressed in at pressures up to 3500 p. s. i. An exothermic reaction took place and the temperature of the autoclave reached 165° C. with pressures between 1200-3500 p. s. i. The reaction rate was 1.1 gram mol./hour. At the completion of the reaction the contents of the autoclave were blown off, filtered and weighed. The reaction product weighed 184 grams. Distillation gave 17 grams of unchanged ethyl crotonate, 105 grams of the aldehyde ester, B. P.$_7$ 85–90° C. and 60 grams of residue comprised largely of the dehydrated aldol condensation product of the aldehyde ester.

The aldehyde ester was oxidized with air to form the half acid ester. In addition to 74 grams of monoethyl glutaric acid ester, B. P.$_{10}$ 134–138° C. 4 grams of ethyl butyrate was also obtained which indicates the presence of a small amount of isomeric alpha formyl ethyl butyrate in the principal product, gamma formyl ethyl butyrate. The acid ester was hydrolyzed and distilled at reduced pressure to give 61 grams of glutaric acid M. P. 95–96.2° C. Glutaronitrile and pentamethylene diamine were also prepared to further prove that the gamma formyl ethyl butyrate was the principal oxonation product of ethyl crotonate.

*Example II*

Thirty grams of cobalt-thoria-magnesia catalyst was suspended in a mixture of 400 ml. of ethyl crotonate and 400 ml. of diethyl ether and the suspension was charged to a rocker autoclave. Carbon monoxide and hydrogen were pressed in at 130–150° C. and 1700–3000 p. s. i. A reaction rate of 4.3 gram mols per hour resulted. The reaction was blown down, and the product was filtered and distilled. In addition to 136 grams of unchanged ethyl crotonate, 231 grams of gamma formyl ethyl butyrate was obtained.

*Example III*

The reaction was carried out as in Example II with only 200 cc. of diethyl ether diluent. The rate of reaction was 6.4 gram moles per hour. 186 grams of gamma formyl ethyl butyrate was obtained.

*Example IV*

Four hundred ml. of benzene was substituted for the diethyl ether of Example II. The rate of reaction was 6.7 gram mols per hour. 175 grams of gamma formyl ethyl butyrate was obtained.

*Example V*

Forty grams of cobalt-thoria-magnesia catalyst was suspended in 400 ml. of ethyl acrylate diluted with 400 ml. of diethyl ether. The suspension was charged to a rocker autoclave and reacted with carbon monoxide and hydrogen at 140–152° C. and 1600–3100 p. s. i. A reaction rate of 5.4 gram mols per hour was obtained. The reaction was blown down, filtered, and distilled. 87 grams of alpha formyl ethyl propionate B. P. 48–52° C. at 10 millimeters and 203 grams of beta formyl ethyl propionate was obtained B. P. 81–84° C. at 10 millimeters.

*Example VI*

Forty grams of cobalt-thoria-magnesia catalyst, 58% reduced, was suspended in a mixture of 400 ml. of diethyl maleate diluted with 400 ml. of dioxane. The suspension was charged to a rocker autoclave and reacted with carbon monoxide and hydrogen at 140–158° C. and 2200–3500 p. s. i. The reaction product was blown off, filtered, and distilled. In addition to unchanged diethyl maleate, 317 grams of alpha formyl diethyl succinate, B. P.$_{1-2\text{ mm}}$ 114–119° C. was obtained.

*Example VII*

Twenty grams of cobalt-silica catalyst, 40% cobalt—70% reduced—was suspended in 200 grams of ethyl sorbate diluted with 400 ml. of diethyl ether. The suspension was charged to a rocker autoclave and reacted with carbon monoxide and hydrogen at 2700–3500 p. s. i. and 135–154° C. Distillation of the reaction product gave 141 grams of isomeric diformyl ethyl sorbates, B. P.20 135–167° C.

*Example VIII*

Two hundred grams of ethyl crotonate was mixed with 10 grams of cobalt carbonyl butanol in 200 ml. of butanol and reacted with carbon monoxide and hydrogen at 143–165° C. and 2150–3400 p. s. i. A reaction rate of 14 gram mols per hour was obtained. The product was blown off and distilled. 169 grams of the gamma formyl ethyl butyrate was obtained.

*Example IX*

Three hundred grams of diethyl maleate, 12 grams of cobalt tetracarbonyl and 300 ml. of diethyl ether were charged to a rocker autoclave. Carbon monoxide and hydrogen were pressed in at 140–155° C. and 2600–3100 p. s. i. A reaction rate of 4.1 gram mols per hour was obtained. Distillation gave 243 grams of alpha formyl diethyl succinate, B. P.2 mm. 114–121° C.

*Example X*

Twenty grams of solid catalyst containing 30.1% cobalt, 1.7% thoria, 2.1% magnesia, and 66 grams of supercel was suspended in 400 grams of ethyl crotonate and charged to a one liter autoclave. Carbon monoxide and hydrogen were pressed in at 2500–3500 p. s. i. and 130±10° C. The rate of oxonation was 4.3 gram mols/hour. Distillation of the product gave a 42% yield of gamma formyl ethyl butyrate.

The above reaction conditions were varied by the addition of 60 grams of water. The rate of oxonation was 13.6 gram mols/hour and a 70.2% yield of gamma formyl ethyl butyrate was obtained.

*Example XI*

400 grams of the ethyl ester of 2-ethyl crotonic acid were reacted as in Example X with no diluent or water present. The rate of oxonation was 3.6 gram moles per hour and a 46% yield of gamma formyl alpha ethyl ethyl butyrate was obtained.

The oxonation was repeated using 20 grams of water. A reaction rate of 11.2 gram mols/hour was observed and a 64% yield of gamma formyl, alpha ethyl ethyl butyrate was obtained.

*Example XII*

Ten grams of cobalt carbonyl was dissolved in 300 grams of butyl crotonate and oxonated at 140±10° C. and 2200–3000 p. s. i. A reaction rate of 5.2 gram mols per hour was observed and a 37% yield of gamma formyl butyl butyrate was obtained.

The above oxonation was repeated using 200 grams of butanol as a diluent and charging the butyl crotonate gradually as the reaction took place. A reaction rate of 19 gram mols/hour was observed and a 78% yield of gamma formyl butyl butyrate was obtained.

*Example XIII*

Two hundred grams of diethyl itaconate and two hundred ml. of ethanol containing 5 grams of cobalt carbonyl were charged to a shaker autoclave. Carbon monoxide and hydrogen were pressed in at 140±10° C. and 2100–3000 p. s. i. A reaction rate of 8.9 gram mols/hour was obtained. Distillation of the product gave 130 grams of alpha formylmethyl diethyl succinate B. P.12 145–151° C.

It will be noted from the foregoing examples that in our reaction there is probably a migration of the double bond during the course of the reaction to form a methylene carbon. With ethyl crotonate the reaction probably can be represented as follows:

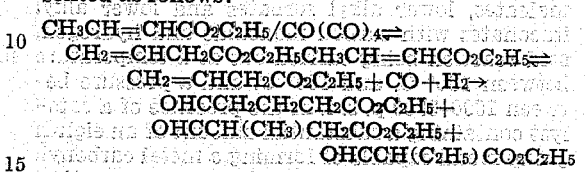

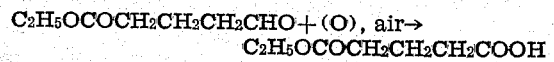

Of the three possible isomers, gamma formyl ethyl butyrate is the principal product. Similarly, with acrylate esters the half aldehyde ester of succinic acid is the principal product. In addition to the aldehyde esters of dicarboxylic acid valuable by-products, the dehydrated aldol condensation products of the aldehyde esters, are also obtained in varying amounts. With ethyl crotonate one of the products is 1,7-dicarbethoxy 3-formyl-3-heptene.

As already mentioned above, the compounds produced by the present invention have many uses. For example, the aldehyde esters of the present invention are easily oxidized with air to form the half acid ester of a dicarboxylic acid.

$$C_2H_5OCOCH_2CH_2CH_2CHO + (O), \text{air} \rightarrow$$
$$C_2H_5OCOCH_2CH_2CH_2COOH$$

The half acid esters are important as intermediates in the preparation of plasticizers, linear polyesters and polyamides.

Gamma formyl ethyl butyrate produced from the ethyl crotonate reaction may be used as the starting point for the preparation of glutaric acid, delta hydroxy and delta amino ethyl valerate, delta valerolactone, 10 carbon dicarboxylic acids, 10 carbon tricarboxylic acids and many others. The delta valerolactone just referred to may be obtained from the hydrogenation of the aldehyde ester followed by the thermal treatment thereof to secure the splitting out of alcohol leaving the lactone. This lactone has particular merit for use in the nail polish remover field and similar solvent purposes.

It is believed from the foregoing that it will be seen that we have provided an improved method for producing useful aldehyde ester compounds.

We claim:

1. The process which comprises reacting ethyl crotonate with carbon monoxide and hydrogen, said reaction being carried out in the presence of a cobalt-containing catalyst, carried in a lower aliphatic alcohol liquid medium, and under temperature and pressure conditions between 130–160° C. and 1600–3500 p. s. i., whereby gamma-formyl ethyl butyrate is formed.

2. The process which comprises reacting ethyl crotonate with carbon monoxide and hydrogen, said reaction being carried out in the presence of a cobalt-containing catalyst carried in butanol and under temperature and pressure conditions between 130–160° C. and 1600–3500 p. s. i. whereby gamma-formyl ethyl butyrate is formed.

3. A process for producing aldehyde esters which comprises reacting an ester of an unsaturated acid from the group consisting of lower alkyl crotonates, lower alkyl maleates, lower alkyl sorbates and lower alkyl itaconates with carbon monoxide and hydrogen, said reaction being carried out at a temperature between 130° C. and 160° C. and a pressure between 1600–3500 p. s. i. in the presence of a catalyst containing a substantial amount of an eighth group metal capable of forming a metal carbonyl.

4. A process for producing aldehyde esters which comprises reacting an ester of the group consisting of lower alkyl crotonates, lower alkyl maleates, lower alkyl sorbates and lower alkyl itaconates with carbon monoxide and hydrogen, said reaction being carried out at a temperature between 130° C. and 160° C. and a pressure between 1600–3500 p. s. i. in the presence of a catalyst containing a substantial amount of an eighth group metal capable of forming a metal carbonyl, said catalyst being further characterized in that it is in an environment essentially comprised of a lower aliphatic alcohol.

5. A process for producing aldehyde esters which comprises reacting a lower alkyl crotonate with carbon monoxide and hydrogen, said reaction being carried out at a temperature between 130–160° C. and a pressure between 1600–3500 p. s. i. in the presence of a catalyst containing a substantial amount of an eighth group metal capable of forming a metal carbonyl, said catalyst being further characterized in that it is in an environment essentially comprised of a lower aliphatic alcohol.

HUGH J. HAGEMEYER, JR.
DAVID C. HULL.

REFERENCES CITED

The following references are of record in the file of this patent:

UNITED STATES PATENTS

| Number | Name | Date |
|---|---|---|
| 2,437,600 | Gresham | Mar. 9, 1948 |